United States Patent
Kim et al.

(10) Patent No.: US 8,670,781 B2
(45) Date of Patent: Mar. 11, 2014

(54) PROVIDING ROUTING TO A MOBILE TERMINAL

(75) Inventors: Nam-Young Kim, Gyeonggi-Do (KR); Jong-Gu Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 276 days.

(21) Appl. No.: 12/753,261

(22) Filed: Apr. 2, 2010

(65) Prior Publication Data

US 2011/0053552 A1    Mar. 3, 2011

(30) Foreign Application Priority Data

Sep. 3, 2009  (KR) ........................ 10-2009-0083187

(51) Int. Cl.
*H04W 24/00* (2009.01)

(52) U.S. Cl.
USPC .................. 455/456.1; 455/456.2; 455/456.3; 455/456.5

(58) Field of Classification Search
USPC .......... 455/404.1, 404.2, 414.1, 414.2, 456.1, 455/456.2, 456.3, 456.5, 456.6, 566; 701/200, 213, 421, 426, 467, 533; 340/990, 995.19, 995.24
See application file for complete search history.

(56) References Cited

U.S. PATENT DOCUMENTS

| | | | |
|---|---|---|---|
| 7,840,222 B2 * | 11/2010 | Hampel et al. | 455/456.1 |
| 2002/0034292 A1 | 3/2002 | Tuoriniemi et al. | |
| 2006/0135134 A1 | 6/2006 | Mezhvinsky et al. | |
| 2007/0281689 A1 * | 12/2007 | Altman et al. | 455/435.1 |
| 2007/0293240 A1 * | 12/2007 | Drennan | 455/456.1 |
| 2009/0030885 A1 | 1/2009 | DePasquale et al. | |
| 2010/0269059 A1 * | 10/2010 | Othmer et al. | 715/774 |

FOREIGN PATENT DOCUMENTS

| | | |
|---|---|---|
| EP | 1418557 A2 | 5/2004 |
| FR | 2927425 A1 | 8/2009 |
| WO | WO 02/06994 A2 | 1/2002 |

OTHER PUBLICATIONS

European Search Report dated Aug. 5, 2010 for Application No. EP10004018.7, 7 pages.

* cited by examiner

*Primary Examiner* — Jean Gelin
(74) *Attorney, Agent, or Firm* — Fish & Richardson P.C.

(57) ABSTRACT

A selection associated with a service provider is received at a user device, the service provider being associated with a first location. A second location that is associated with the user is determined at the user device. A service request and the determined second location associated with the user are sent from the user device and to a destination associated with the service provider. A route between the first and second locations to be used by the service provider is received from the service provider. A map including the route between the first and second locations to be used by the service provider is rendered on the user device.

31 Claims, 15 Drawing Sheets

PROVIDING ROUTING TO A MOBILE TERMINAL

CROSS-REFERENCE TO A RELATED APPLICATION

Pursuant to 35 U.S.C. §119(a), this application claims the benefit of an earlier filing date and right of priority to Korean Application No. 10-2009-0083187 filed on Sep. 3, 2009, the contents of which are incorporated by reference herein in its entirety.

BACKGROUND

Mobile devices can be used to provide wireless communication between users. In particular, a user of a mobile device can place a telephone call to a landline or to another user of a mobile device. As mobile device capability has advanced in recent years, mobile devices have increasingly become able to provide functionality in addition to wireless communication. For example, some mobile devices provide internet access and other functionality.

SUMMARY

In general, in some aspects, a method includes receiving, at a user device, a selection associated with a service provider, the service provider being associated with a first location. The method also includes determining, at the user device, a second location, the second location being associated with the user. The method further includes sending, from the user device and to a destination associated with the service provider, a service request and the determined second location associated with the user. The method additionally includes receiving, from the service provider, a route between the first and second locations to be used by the service provider. Finally, the method includes rendering, on the user device, a map including the route between the first and second locations to be used by the service provider.

This and other implementations can optionally include one or more of the following features, which also may optionally be in any combination. For example receiving the selection associated with the service provider may include receiving a request for a taxi. Rendering the map including the route may include rendering a map indicating a path to be traversed by a taxi from the first location to the second location. The method may also include receiving, from the service provider, an indication corresponding to a taxi fare. Further, the method may include rendering, on the user device, a list of multiple taxi service providers. Receiving the selection associated with the service provider may include receiving a selection of a particular taxi service provider from the rendered list of multiple taxi service providers.

In addition, receiving the route may include receiving a designation of a current location of a taxi and a route the taxi is expected to take from the current location of the taxi to the user device. Determining the second location associated with the user may include determining the location of the user device. Determining the second location associated with the user may include determining a location other than the location of the user device. The method may also include receiving, at the user device, input designating a location as the second location. Receiving the route may include receiving a route computed by the service provider. Receiving the selection associated with the service provider may include receiving a request for an emergency responder.

Further, receiving the request for an emergency responder may include receiving a request for an ambulance. Receiving the selection associated with the service provider may include receiving a request for a substitute driver. Receiving the selection associated with the service provider may include receiving a request for a door-to-door delivery.

In other implementations, some aspects include a mobile terminal. The mobile terminal includes an input unit configured to receive input from a user and a communication unit configured to communicate across a wireless network. The mobile terminal also includes a display and a controller. The controller is configured to receive, from the input unit, an indication of a user selection association with a service provider, the service provider being associated with a first location. The controller is also configured to determine a second location, the second location being associated with the user. The controller is further configured to send, with the communication unit and to a destination associated with the service provider, a service request and the determined second location associated with the user. Additionally, the controller is configured to receive, from the service provider and with the communication unit, a route between the first and second locations to be used by the service provider. Finally, the controller is configured to enable rendering, on the display, of a map that includes the route between the first and second locations to be used by the service provider.

This and other implementations can optionally include one or more of the following features, which also may optionally be in any combination. For example, to receive the selection associated with the service provider, the controller can be configured to receive a request for a taxi. The controller can be configured to receive, from the service provider and with the communication unit, an indication corresponding to a taxi fare and to enable rendering, on the display, of the indication corresponding to the taxi fare. Also, the controller can be configured to enable rendering, on the display, of a list of multiple taxi service providers. To receive the selection associated with the service provider, the controller can be configured to receive a selection of a particular taxi service provider from the rendered list of multiple taxi service providers.

Also, to receive the route, the controller can be configured to receive, with the communication unit, a designation of a current location of a taxi and a route the taxi is expected to take from the current location of the taxi to the mobile terminal. The mobile terminal can also include a global positioning system unit. To determine the second location associated with the user, the controller can be configured to determine, with the global positioning unit, the location of the mobile terminal.

Further, to determine the second location associated with the user, the controller can be configured to receiver, from the input unit, input designating a location as the second location. To receive the selection associated with the service provider, the controller can be configured to receive a request for an emergency responder. To receive the selection associated with the service provider, the controller can be configured to receive a request for an ambulance. To receive the selection associated with the service provider, the controller can be configured to receive a request for a substitute driver. To receive the selection associated with the service provider, the controller can be configured to receive a request for a door-to-door delivery.

DETAILED DESCRIPTION

Figure 1:
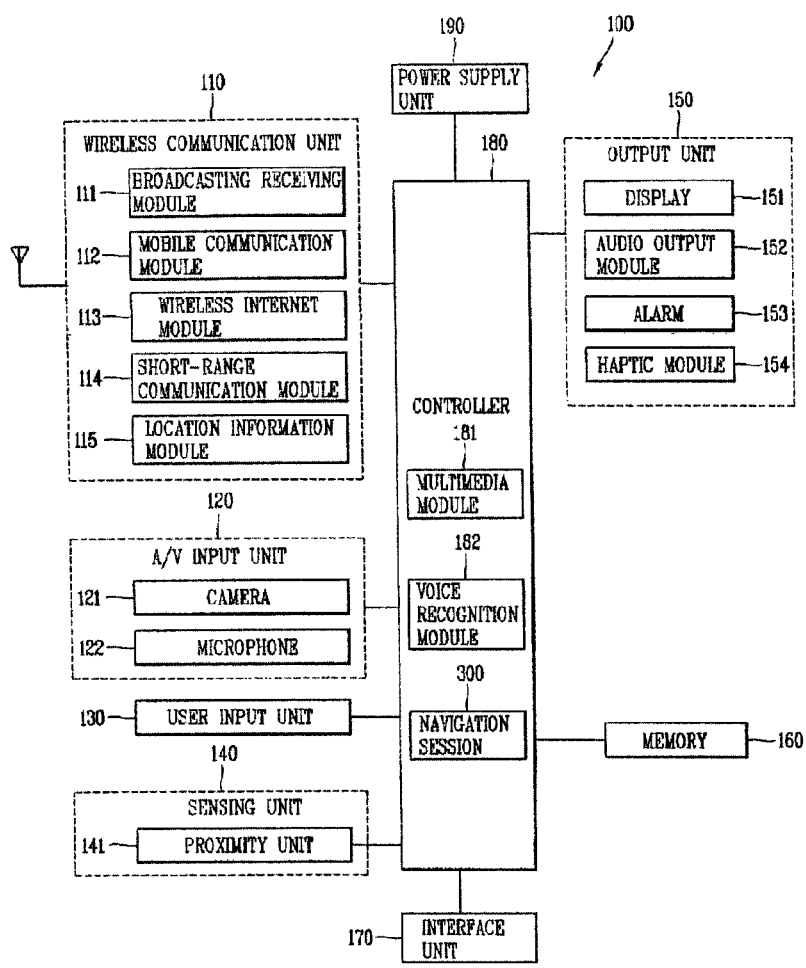
FIG. 1 is a schematic block diagram illustrating a configuration of a mobile communication terminal.

FIG. 1 is a block diagram illustrating a configuration of a mobile terminal 100. The mobile terminal (mobile phone) 100 may be implemented in various forms. For example, the mobile terminal may include a portable phone, a smart phone, a notebook computer, a digital broadcast receiver, a Personal Digital Assistant (PDA), or a Portable Multimedia Player (PMP).

As illustrated in FIG. 1, the mobile terminal 100 may include a wireless communication unit 110, an Audio/Video (A/V) input unit 120, a user input unit 130, a sensing unit 140, an output unit 150, a memory 160, an interface unit 170, a controller 180, and a power supply unit 190. All the elements of the mobile terminal 100, as illustrated in FIG. 1, are not necessarily required. In particular, various implementations of the mobile terminal 100 may include greater or fewer components in configurations other than the configuration illustrated by FIG. 1.

The wireless communication unit 110 can include one or more elements that enable radio communication between the mobile terminal 100 and a wireless communication system or enable radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits to the mobile terminal 100. The broadcast associated information may be information regarding a broadcast channel, a broadcast program, or a broadcast service provider. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, broadcast associated information may be implemented according to various formats, such as Electronic Program Guide (EPG) of Digital Multimedia Broadcasting (DMB) or Electronic Service Guide (ESG) of Digital Video Broadcast-Handheld (DVB-H).

The broadcast receiving module 111 may receive a broadcast signal using various types of broadcast systems. In particular, the broadcast receiving module 111 may receive a digital broadcast signal using a digital broadcast system, such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), or other broadcast systems. The broadcast signal and/or broadcast-associated information received through the broadcast receiving module 111 may be stored in the memory 160.

The mobile communication module 112 may transmit and receive a radio signal to and from at least one of a base station, an external terminal, and a server over a mobile communication network. Here, the radio signal may include a voice call signal, a video call signal and/or various types of data according to text and/or multimedia message transmission and/or reception.

The wireless Internet module 113 can include a module for supporting wireless Internet access. The wireless Internet module 113 may be built-in or externally installed to the mobile terminal 100. Also, the wireless Internet module 113 may use one of various wireless Internet access techniques, such as Wireless LAN (WLAN), Wi-Fi, Wireless Broadband (Wibro), World Interoperability for Microwave Access (Wimax), or High Speed Downlink Packet Access (HSDPA).

The short-range communication module 114 is a module for supporting a short-range communication. The short-range communication module 114 may use various short-range communication technology, such as Bluetooth, Radio Frequency Identification (RFID), Infrared Data Association (IrDA), Ultra WideBand (UWB), or ZigBee.

The location information module 115 is a module for checking or acquiring a location of the mobile terminal or vehicle in which the mobile communication terminal is located. A Global Positioning System (GPS) module is an example. For example, the location information module 115 may be embodied using a GPS module that receives location information from a plurality of satellites. The GPS module receives location information from a plurality of satellites. Here, the location information may include coordinate information represented by latitude and longitude values. For example, the GPS module may measure time and distance with respect to three or more satellites so as to calculate a current location according to trigonometry based upon three different distances. A method of acquiring distance and time information from three satellites and performing error correction with a single satellite may be used. In particular, the GPS module may acquire time and three-dimensional speed information as well as a latitude, longitude, and altitude from the location information received from the satellites. For the location information module 115, a Wi-Fi positioning system and/or a hybrid positioning system may be used.

The A/V input unit 120 receives an audio or video signal and may include a camera 121 and a microphone 122. The camera 121 processes a image frame, such as still picture or video, obtained by an image sensor in a video phone call or image capturing mode. The processed image frame may be displayed on a display unit 151. The image frames processed by the camera 121 may be stored in the memory 160 (or other storage medium) or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, or other mode and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may include a keypad, a dome switch, a touch pad (pressure/capacitance), a jog wheel, or a jog switch. In particular, when the touch pad is combined with a display unit 151 to form an inter-layer structure, it may be called a touch screen.

The sensing unit 140 detects a current status of the mobile terminal 100 such as an opened or closed state of the mobile terminal 100, a location of the mobile terminal 100, the presence or absence of user contact, an orientation of the mobile terminal 100, an acceleration or deceleration movement of the mobile terminal 100, or other input mechanisms so as to generate a sensing signal for controlling the operation of the mobile terminal 100. For example, when the mobile terminal 100 is a slide phone type, it may sense an opened or closed state of the slide phone. Furthermore, the sensing unit 140 can detect whether or not the power supply unit 190 supplies power or whether or not the interface unit 170 is coupled with an external device.

The interface unit 170 serves as an interface to every external device that may be connected with the mobile communication terminal 100. For example, the interface unit 170 may include a wired or wireless headset port, an external battery charger port, a wired or wireless data port, a memory card port, a ports for connecting a device having an identification module, an audio input/output (I/O) port, an video input/output (I/O) port, or an earphone port. Here, the identification module, as a chip that stores various information for authenticating the authority to use the mobile communication terminal 100, may include a user identity module (UIM), a subscriber identity module (SIM) or a universal subscriber identity module (USIM). In addition, the device having the identification module (hereinafter, 'identifying device') may be made in a form of smart card. Accordingly, the identifying device may be connected with the mobile communication terminal 100 through a port. The interface unit 170 is provided to receive data or power from an external device and transfer the received data or power to elements within the mobile communication terminal 100 or may be used to transfer data within the mobile terminal 100 to an external device.

The output unit 150 is configured to provide an output for audio signal or hearing sense related signal, video signal, or alarm signal or visual sense related signal and the output unit 150 may include the display unit 151, an audio output module 152, and an alarm unit 153.

The display unit 151 may output information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or a GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display. There may exist two or more display units 151 according to desired functionality. For example, a plurality of display units may be arranged on one side in a separated or integrated manner, or arranged on different surfaces in the mobile terminal 100.

When the display unit 151 and a sensor for detecting a touch operation (hereinafter, 'touch sensor') are formed with a interlayer structure (hereinafter, 'touch screen'), the display unit 151 may be also used as an input device in addition to an output device. The touch sensor may be configured in a form of, for example, touch film, touch sheet, touch pad, or touch panel. In some cases, touch sensors (or touch screens) can operate without an actual physical contact. For example, touch screens operating on changed capacitance or other electrical characteristics may operate by the nearby presence of a finger or object with or without physical contact with the screen. As such, a "touch screen" may not actually require a touch for operation.

Furthermore, the touch sensor may be configured to convert a change such as pressure applied to a specific area of the display unit 151 or capacitance or other electrical characteristic generated on a specific area of the display unit 151 into an electrical input signal. The touch screen may be configured to detect a touch input pressure as well as a touch input position and a touch input area. When there is a touch input to the touch sensor, a signal corresponding to the touch input is sent to a touch controller (not shown). The touch controller processes the signal and then sends the corresponding data to a controller 180. By this, the controller 180 may know whether or not any region is touched on the display unit 151.

Figure 2:
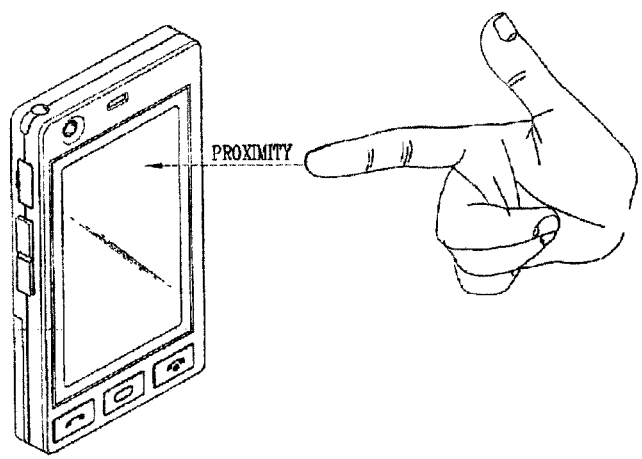
FIG. 2 illustrates a proximity touch.

Hereinafter, a proximity sensor 141 of a mobile communication terminal 100 will be described with reference to FIG. 2. FIG. 2 illustrates a proximity touch with a mobile communication terminal 100. A proximity-touch can, for example, refer to recognition of the pointer positioned to be close to the touch screen without being in contact with the touch screen.

The proximity sensor 141 may be arranged in an inner region of the mobile terminal 100 surrounded by a touch screen or may be arranged adjacent to the touch screen. The proximity sensor 141 is a sensor for detecting the presence or absence of an object approaching to a certain detection surface or an object that exists nearby by using the force of electromagnetism or infrared rays without a mechanical contact. Thus, the proximity sensor 141 can have a longer life span than a contact type sensor and can be utilized for various purposes.

Examples of the proximity sensor 141 may include a transmission type photo sensor, a direct reflection type photo sensor, a mirror-reflection type photo sensor, an RF oscillation type proximity sensor, a capacitance type proximity sensor, a magnetic proximity sensor, and an infrared proximity sensor. When the touch screen is an electrostatic type, the approach of a pointer can be detected based on a change in a field according to the approach of the pointer. For example, the touch sensor may be classified as a proximity sensor.

In the following description, for the sake of brevity, recognition of the pointer positioned to be close to the touch screen, although the pointer is not actually brought into contact with the touch screen, will be called a "proximity touch," while recognition of actual contacting of the pointer on the touch screen will be called a "contact touch." Furthermore, the proximity sensor 141 can detect a proximity touch and a proximity touch pattern (e.g., a proximity touch distance, a proximity touch direction, a proximity touch speed, a proximity touch time, a proximity touch position, or a proximity touch movement state). Information corresponding to the detected proximity touch operation and the proximity touch pattern can be outputted to the touch screen.

The audio output module 152 may output audio data received from the wireless communication unit 110 or stored in the memory 160 in various modes. The modes may include a call signal reception mode, a call mode, a record mode, a voice recognition mode, a broadcast reception mode, or other modes. Also, the audio output module 152 may output an audio signal associated with the function performed by the mobile terminal 100 (e.g., a call signal reception sound or a message reception sound, etc.). The audio output module 152 may include a receiver, a speaker, or a buzzer.

The alarm unit 153 may output a signal to notify a user of the occurrence of an event of the mobile terminal 100. Events generated in the mobile communication terminal may include receipt of a call, receipt of a message, or received key or touch input. In addition to an audio or video output, the alarm unit 153 may output a signal in a different manner to notify a user of the occurrence of an event. For example, the alarm unit 153 may output in a form of vibration. When a call signal or message is received, the alarm unit 153 may vibrate the mobile terminal 100 through vibration. When a key signal is inputted, the alarm unit 153 may vibrate the mobile terminal 100 using a feedback to the key signal input. The user can recognize an occurrence of the vibration as described above. The signal for notifying an occurrence of the event may be output through the display unit 151 or the audio output module 152, and therefore, those units 151, 152 may be classified as part of the alarm unit 153.

The haptic module 154 generates various tactile effects felt by the user. An example of the tactile effects generated by the haptic module 154 is vibration. The strength and pattern of the haptic module 154 can be controlled. For example, different vibrations may be combined and outputted or sequentially outputted. The haptic module 154, in addition to vibration, may generate various tactile effects, including an effect by stimulation with a pin arrangement moving vertically against the contacted skin surface, an ejection or suction force of air through the ejection or suction port, a brush against the skin surface, a contact of the electrode, electrostatic force, and the sense of cold or warmth using an element that can absorb or generate heat. In addition, the haptic module 154 may be implemented so as to allow a user to feel a tactile effect through muscular senses by a finger or arm of the user as well as to transfer a tactile effect through direct contact. There may exist two or more haptic modules 154 according to configuration. The haptic module 154 may be provided at a place frequently being contacted by the user in a vehicle. For example, it may be provided on a steering wheel, a gearshift lever, a seat, or other area.

The voice recognition module 182 recognizes a voice uttered by a user, and performs a relevant function based on the recognized voice signal.

The memory 160 may store software programs for processing and controlling the controller 180, or may temporarily store data (e.g., phonebook, message, still image, or video) that are inputted and/or outputted. The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, or an optical disk. Also, the mobile terminal 100 may run a web storage that performs the storage function of the memory 160 over the Internet or operates in association with the web storage.

The interface unit 170 serves as an interface to external devices that may be connected with the mobile terminal 100. For example, the interface unit 170 may include a wired or wireless headset port, an external battery charger port, a wired or wireless data port, a memory card port, a ports for connecting a device having an identification module, an audio I/O port, an video I/O port, or an earphone port. Here, the identification module, as a chip that stores various information for authenticating the authority to use the mobile terminal 100, may include a UIM, a SIM, or a USIM. In addition, the device having the identification module (hereinafter, 'identifying device') may be made in a form of smart card. Accordingly, the identifying device may be connected with the mobile terminal 100 through a port. The interface unit 170 can be provided to receive data or power from an external device and transfer the received data or power or data to elements within the mobile terminal 100 or to an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal 100 therethrough. Various command signals or power inputted from the cradle may operate as a signal for recognizing when the mobile terminal is properly mounted on the cradle.

The controller 180 typically controls a general operation of the mobile terminal 100. For example, the controller 180 performs a control and processing operation associated with a voice call, a data communication, or a video phone call. In addition, the controller 180 may include a multimedia module 181 for reproducing multimedia content. The multimedia module 181 may be provided within the controller 180 or may be separately provided from the controller 180. The controller 180 may perform a pattern recognition processing to recognize a handwriting or picture-drawing input performed on the touch screen as a character or image, respectively. The power supply unit 190 receives external or internal power to supply the power required for an operation of each element under a control of the controller 180.

The function of an element applied to the mobile terminal 100 may be implemented in a computer-readable medium using software, hardware, or a combination thereof. For hardware implementations, techniques described below may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described below. In some implementations, functionality may be implemented in the controller 180. For software implementations, the techniques described below may be implemented together with separate software modules that allow performing of at least one function or operation. Software codes can be implemented by a software application written in a programming language. The software codes may be stored in the memory 160 and executed by the controller 180.

Figure 3:
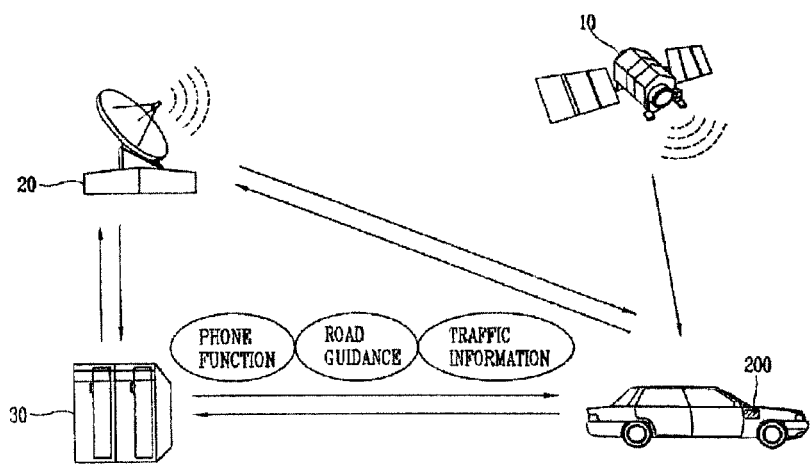
FIG. 3 is a schematic block diagram illustrating a vehicle navigation system.

A navigation session 300 applied to the mobile communication terminal 100 can be used in displaying a traveling route. FIG. 3 is a block diagram illustrating a vehicle navigation system. As illustrated in FIG. 3, the vehicle navigation system may include an information providing center 30 for providing traffic information and various data. A telematics terminal 200 can be included within a vehicle for receiving traffic information through a long-range wireless communication network 20 and/or a short-range wireless communication network and for providing a road guide service based on a GPS signal received through a satellite 10 and the traffic information.

Figure 4:
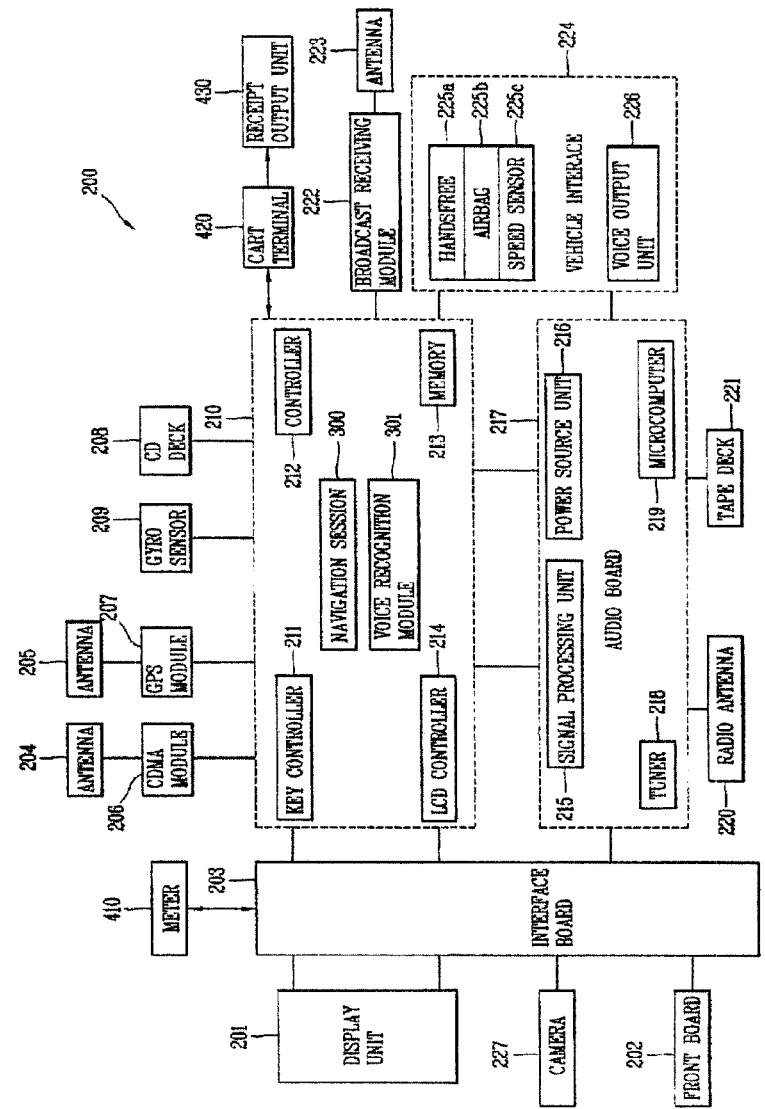
FIG. 4 is a schematic block diagram illustrating a configuration of a telematics terminal.

FIG. 4 is a block diagram illustrating a configuration of a telematics terminal. As illustrated in FIG. 4, the telematics terminal 200 may include a main board 210 in which a controller, such as a central processing unit (CPU) 212, controls an overall operation of the telematics terminal 200, a memory 213 for storing various information, a key controller 211 for controlling various key signals, and a LCD controller 214 for controlling an LCD.

The memory 213 stores map information for displaying road guide information on a digital map. Also, the memory 213 stores a traffic information collection and control algorithm for allowing inputting of traffic information, by a user, according to a present condition of a road on which the vehicle is currently traveling.

The main board 210 includes a Code Division Multiple Access (CDMA) module 206 and a GPS module 207. The GPS module 207 can guide a location of the vehicle, track a travel path from the departure to the destination, and transmit traffic information collected by the user as GPS signals. The main board 210 can also include a compact disk (CD) deck 208 for reproducing a signal written on a CD and a gyro sensor 209. The CDMA module 206 and the GPS module 207 transmit and/or receive through antennas 204, 205.

Furthermore, a broadcast receiving module 222 is connected to the main board 210 to receive broadcast signals through an antenna 223. The main board 210 is connected to an LCD display unit 201 that is controlled by the LCD controller 214 through an interface board 203, a front board 202 that is controlled by a key controller 211, and a camera 227 for capturing an inside and/or outside of the vehicle. The display unit 201 displays various video or text signals and the front board 202 is provided with buttons for inputting various key signals to provide key signals corresponding to the buttons made by the user's selection. Furthermore, the display unit 201 may include a proximity sensor and a touch sensor. Also, the front board 222 is provided with menus keys for directly inputting traffic information and the menu keys may be configured to be controlled by the key controller 211.

The audio board 217 is connected to the main board 210 to process various audio signals. The audio board 217 includes a microcomputer 219 for controlling the audio board 217, a tuner 218 for receiving radio signals, a power supply unit 216 for supplying power to the microcomputer 219, and a signal processing unit 215 for processing various audio signals. Furthermore, the audio board 217 is connected to a radio antenna 220 for receiving radio signals, and a tape deck 221 for reproducing an audio tape. The audio board 217 is connected to an audio output unit (e.g., an amplifier) 226 for outputting audio signals that have been signal-processed in the audio board 217.

The audio output unit 226 and the main board 210 are connected to a vehicle interface 224. The vehicle interface 224 may be connected to a hands-free 225a for inputting an audio signal without using vehicle driver's hands, an airbag 225b for providing passenger's safety, and a speed sensor 225c for detecting the speed of a vehicle. The speed sensor 225c calculates the speed of a vehicle and provides the calculated vehicle speed information to the central processing unit 212.

The navigation session 300 applied to the telematics terminal 200 generates road guide information based on map data and the current location information of a vehicle and notifies the user of the generated road guide information. The display unit 201 can sense a proximity touch within the display window through a proximity sensor. For example, when a pointer (e.g., a finger or stylus pen) is proximity-touched, the display unit 201 may detect the location of the proximity touch and output location information corresponding to the detected location to the controller 212. The voice recognition device (or voice recognition module) 301 recognizes a voice uttered by a user and performs a relevant function based on the recognized voice signal.

A navigation session 300 applied to the mobile communication terminal 200 displays a travel path on a data map and forms a wireless network together with a terminal (e.g., a vehicle navigation device) mounted on a neighboring vehicle and/or a mobile communication terminal carried by a neighboring pedestrian through a wireless communication (e.g., short-range wireless communication network) when the location of the mobile communication terminal 100 is within a predetermined distance from a dead zone included in the travel path, thereby receiving the location information of the neighboring vehicle from the terminal mounted on the neighboring vehicle and receiving the location information of the neighboring pedestrian from the mobile communication terminal carried by the neighboring pedestrian.

Figure 5:
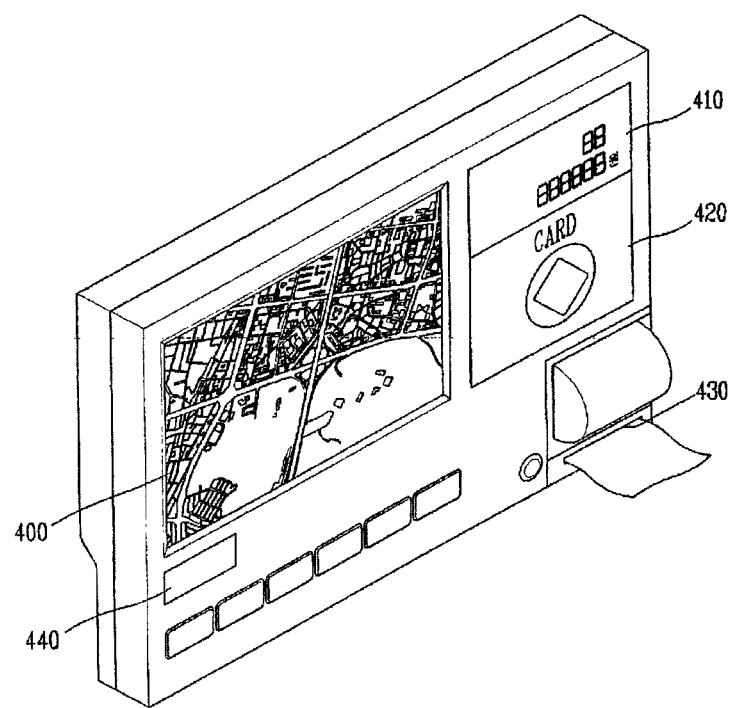
FIG. 5 illustrates a telematics terminal.

FIG. 5 illustrates the telematics terminal 200. As illustrated in FIGS. 4 and 5, a meter 410 connected to the interface board 203 calculates a travel distance and travel time of the vehicle and a fare corresponding to the travel distance and travel time, and transmits the calculated fare to the user's mobile terminal 200 through a communication unit 206 or short-range communication unit (e.g., a Bluetooth communication). The meter may be implemented as a meter being used in a taxi with the functionality described herein.

A high-pass terminal 440 connected to the interface board 203 is a device for automatically authorizing a tollgate (highway toll) fee with no stop at the tollgate when a vehicle travels on the highway. A card terminal 420 connected to the main board 210 is a device for authorizing various cards such as credit card or (to, for example, authorize a taxi fare). Here, a receipt output unit 430 connected to the card terminal 420 can output an authorized card statement (e.g., taxi fare receipt) through the card terminal 420.

Figure 6:
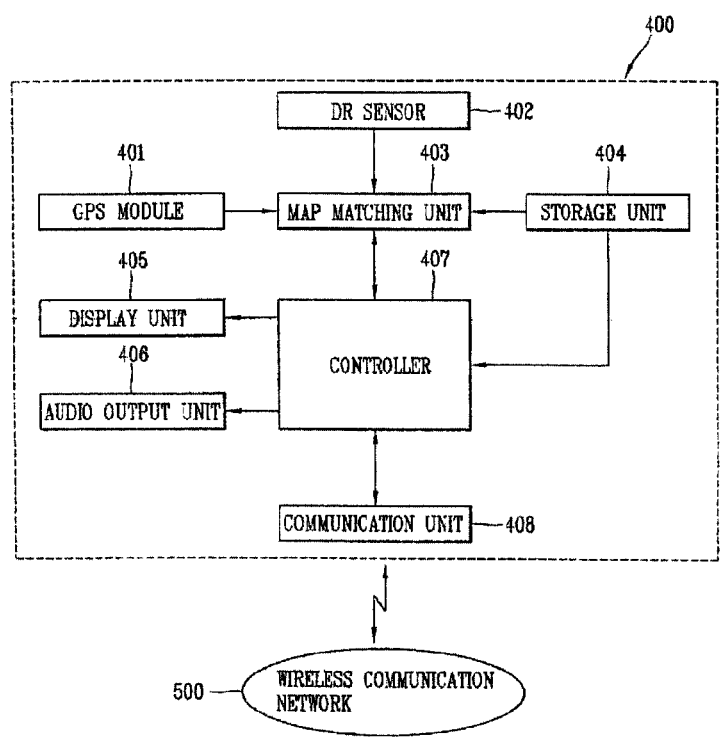
FIG. 6 is a schematic block diagram illustrating a configuration of a vehicle navigation device.

FIG. 6 is a schematic block diagram illustrating a configuration of a vehicle navigation device 400. The vehicle navigation device 400 may be configured in the telematics terminal 200, or may be configured independently.

As illustrated in FIG. 6, the vehicle navigation device 400 may be configured by including a GPS module 401 for receiving a GPS signal from a satellite and for generating vehicle location data of the navigation device (regarded as the same location as that of telematics terminal 200 or mobile communication terminal 100) based on the received GPS signal. The vehicle navigation device may also include a dead-reckoning (DR) sensor 402 for generating second vehicle location data based on the traveling direction of a vehicle and the speed of the vehicle, a storage unit (or memory) 404 for storing map data and various information, a map matching unit 403 for generating an estimated vehicle location based on the first vehicle location data and the second vehicle location data, matching the generated estimated vehicle location with a link within the map data stored the storage unit 404, and for outputting the matched map information.

In addition, the vehicle navigation device 400 may include a communication unit 408 for receiving real-time traffic information from an information providing center and/or neighboring vehicles through a wireless communication network 500 and performing a phone communication, a controller 407 for generating road guide information based on the matched map information, a display unit 405 for displaying a road guide map (including point-of-interest information) included in the road guide information, and an audio output unit 406 for outputting road guide voice information included in the road guide information. Here, the communication unit 408 may further include a hands-free having a Bluetooth module. The road guide information may include various information related to driving, such as traffic lane information, driving speed limit information, turn-by-turn list information, traffic safety information, traffic guide information, vehicle information, road search information, and map data.

Furthermore, the signal received through the GPS module 401 may be configured to provide the location information of a terminal to the navigation device 400 using wireless communication methods proposed by the Institute of Electrical and Electronics Engineers (IEEE), such as the IEEE 802.11 Wireless Network Standard for a wireless LAN including wireless LANs, infrared communications, IEEE 802.15 Standard for a wireless personal area network (PAN) including Bluetooth, UWB, ZigBee, the IEEE 802.16 Standard for a wireless metropolitan area network (MAN) broadband wireless access (BWA) including fixed wireless accesses (FWA), and the IEEE 802.20 Mobile Internet Standard for a wireless MAN mobile broadband wireless access (MBWA) including Wibro and WiMAX.

The navigation device 400 may further include an input unit and the input unit can be used to select the user's desired function or to receive information. The input unit can include various devices, such as a keypad, touch screen, jog shuttle, or microphone.

The map matching unit 403 generates an estimated location of the vehicle on the basis of the first location data and the second location data and reads the map data corresponding to a travel path from the storage unit 307. Furthermore, the map matching unit 403 matches the estimated location of the vehicle with a link (e.g., a road) included in the map data and outputs the matched map information to the controller 407. For example, the map matching unit 403 generates an estimated location of the vehicle on the basis of the first location data and the second location data, matches the generated estimated location of the vehicle with links within the map data stored in the storage unit 404 based upon the link sequence thereof, and outputs the matched map information to the controller 407. The map matching unit 403 outputs road attribute information, such as single-level or double-level roads included in the matched map information to the controller 407. Furthermore, the function of the map matching unit 403 may be implemented by the controller 407.

The storage unit 404 stores map data. The stored map data may include geographic coordinates for displaying the longitude and latitude in the Degree/Minute/Second (DMS) units. Here, the stored map data may use the Universal Transverse Mercator (UTM) coordinate, the Universal Polar System (UPS) coordinate, the Transverse Mercator (TM) coordinate, or other system in addition to the geographic coordinate. The storage unit 404 stores various information, such as various menu screens, points of interest (hereinafter, "POI"), function characteristic information based upon specific locations of the map data, and the like. Also, the storage unit 404 stores various UIs and/or GUIs. Furthermore, the storage unit 404 stores data and programs used in operating the navigation device 400. In addition, the storage unit 404 stores destination information inputted from the user through the input unit.

The display unit 405 displays image information such as a road guide map included in the road guide information generated by the controller 407. Here, the display unit 405 may include a touch sensor or proximity sensor. Furthermore, the road guide information may include various information associated with driving a vehicle, such as traffic lane information, driving speed limit information, turn-by-turn information, traffic safety information, traffic guide information, vehicle information, and road search information, in addition to map data.

Furthermore, when displaying the image information, the display unit 405 may display various contents, such as various menu screens and road guide information using UIs and/or GUIs included in the storage unit 404. Here, the contents displayed on the display unit 405 include various text or image data and menu screens including icons, list menus, and combo boxes.

The audio output unit 406 outputs voice information (or voice messages for road guide information) included in the road guide information generated by the controller 407. Here, the audio output unit 406 may be an amplifier or speaker.

The controller 407 generates road guide information on the basis of the matched map information and outputs the generated road guide information to the display unit 405 and audio output unit 406. Here, the display unit 405 displays the road guide information. The controller 407 receives real-time traffic information from the information providing center and/or a terminal mounted on a neighboring vehicle (vehicle navigation device) to generate road guide information. The controller 407 can be connected with a call center through a communication unit 408 to perform a phone call or transmit or receive information between the navigation device 400 and the call center. The communication unit 408 may further include a hands-free module having a Bluetooth function using a short-range wireless communication method.

Figure 7:
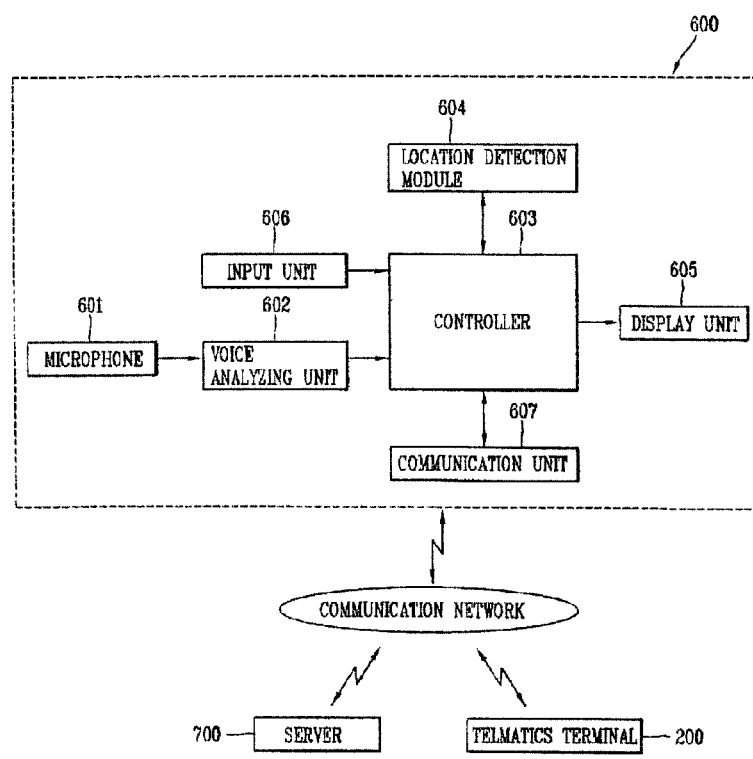
FIG. 7 is a schematic block diagram illustrating a service providing system.

The service providing system and process thereof as illustrated in FIG. 7 may be applicable to various terminals, such as a smart phone, a notebook computer, a digital broadcast receiver, a PDA, a PMP, a mobile communication terminal 100, a telematics terminal 200, and a vehicle navigation device 400.

FIG. 7 is a block diagram illustrating a service providing system. The service providing system may include a mobile terminal 600 and a telematics terminal 200. The mobile terminal 600 may be a mobile communication terminal 200.

As illustrated in FIG. 7, the mobile terminal may include a microphone 601 for receiving voice, a voice analyzing unit 602 for analyzing the voice inputted from the microphone 601 to extract word information, an input unit 606 for receiving a user's input, a location detection unit 604 for detecting a current location, a controller 603. The controller 603 can be configured for recognizing a destination corresponding to the extracted word information, receiving destination information inputted through the input unit 606, and outputting the current location information and the destination information. The mobile terminal can also include a display unit 605 for displaying the current location information and the destination information and a communication unit 607 for transmitting the current location information and the destination information through a communication network.

The telematics terminal 200 receives the current location information of a mobile terminal 600 and the destination information through the communication network and transmits taxi information and the current location information of the taxi to the mobile terminal 600 through the communication network. Here, the current location information of the mobile terminal 600 and the destination information may be transmitted to the telematics terminal 200 through a taxi company server 700.

Figure 8:
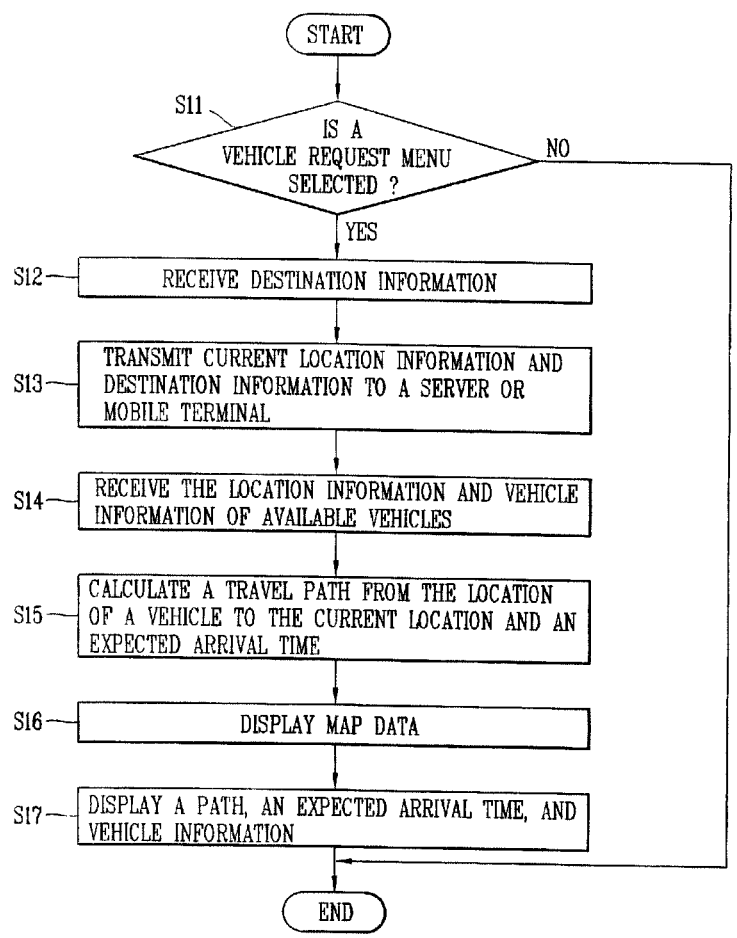
FIG. 8 is a flow chart illustrating a first service providing process of a mobile terminal.

FIG. 8 is a flow chart illustrating a first service providing process of a mobile terminal. The first service providing process can be used in the context of a user requesting a taxi and confirming the request using a mobile terminal.

First, it is determined whether a vehicle request menu has been selected (S11). In particular, the controller 603 determines whether or not the user has selected a taxi request menu through a microphone 601 or input unit 606. For example, the controller 603 determines whether the taxi request menu displayed on the display unit 605 has been touched by the user, whether "taxi" has been spoken through the microphone 601 by the user, or whether the taxi request menu is selected through the input unit 606 by the user.

If the vehicle request menu is selected, destination information is received (S12). More specifically, if the taxi request menu is selected by the user, the controller 603 receives destination information through the microphone 601 or input unit 606. For example, if a destination name is spoken through the microphone 601 by the user, or destination information (destination name) is inputted through the input unit 606 by the user, then the controller 603 receives the inputted destination information. At this time, the location detection unit 604 detects a current location to output the detected current location to the controller 603. Here, the controller 603 may additionally set a menu for automatically transmitting the current location information and destination information to a particular server (preset server) in advance.

Next, current location information and destination information is transmitted to a server or mobile terminal (S13). For example, the controller 603 receives the destination information and the current location information, and transmits the destination information and the current location information to a taxi company server 700 or a telematics terminal 200 mounted on a taxi through a communication network of the communication unit 607. The controller 603 may transmit a ride reservation time as well as the destination information and the current location information to the telematics terminal 200 through a communication network.

Here, the server 700 may be a server for managing taxis in an integrated way, and may transmit the destination information and the current location information only to a telematics terminal 200 mounted on an available taxi (e.g., a taxi with no passenger) through the communication network. As a result, the destination information and the current location information of the mobile terminal 600 may be transmitted to the telematics terminal 200 through the server 700, or may be directly transmitted to the telematics terminal 200. The server 700 or the telematics terminal 200 may be set in the controller 603 of the mobile terminal 600 in advance.

The telematics terminal 200 receives the destination information and the current location information and transmits vehicle information and the current location information of the vehicle to the mobile terminal 600 through the communication network based on a taxi driver's selection. For example, a key for transmitting vehicle information and current location information may be displayed when the destination information and the current location information is received. The key may be selected by a taxi driver and the telematics terminal 200 may transmit vehicle information (e.g., vehicle number, vehicle color, vehicle model, driver's photo, and driver's personal information) and current location information to the mobile terminal 600 through the communication network. Here, the vehicle information and current location information are stored in a storage unit of the mobile terminal 600 (not shown).

When a key for transmitting vehicle information and current location information is selected by a taxi driver, the telematics terminal 200 may transmit a message notifying that a ride reservation is completed to the mobile terminal 600 through a communication network.

The location information and vehicle information of available vehicles is received (S14). In particular, the communication unit 607 receives the vehicle information and current location information from the telematics terminal 200 through the communication network, and outputs the received vehicle information and current location information to the controller 603.

Then, a travel time and a travel path from the location of a vehicle to the current location are calculated (S15). More particularly, the controller 603 calculates a travel path from the current location of the vehicle to the current location of the mobile terminal 600 based on the current location information of the vehicle. Furthermore, the controller 603 calculates an expected arrival time from the current location of the vehicle to the current location of the mobile terminal 600 based on the current location information of the vehicle. Thereafter, map data is display (S16) along with a path, expected arrival time, and vehicle information (S17). That is, the controller 603 calculates the travel path and the expected arrival time, and then reads map data from a storage unit and displays the read map data on the display unit 605. The controller 603 displays the travel path, the expected arrival time, and the vehicle information on the map data.

Although FIG. 8 is described with respect to a taxi service, the process of FIG. 8 can be conducted in providing other services, commercial or non-commercial in nature. For example, in some implementations, the process of FIG. 8 is conducted in order for an individual to receive a ride from a friend. As such, a mapping functionality server or another mobile terminal may be used instead of a taxi company server. For example, in various implementations, the request is sent from the requesting mobile terminal to a mobile terminal of a recipient (e.g., a cell phone of the user's contact list). The mobile terminal of the recipient is the device which receives the transmitted current location information and destination information and which calculates the travel path and expected arrival time. The calculated travel path and expected arrival time are then sent from the recipient's mobile terminal to the user's mobile terminal.

Figure 9:
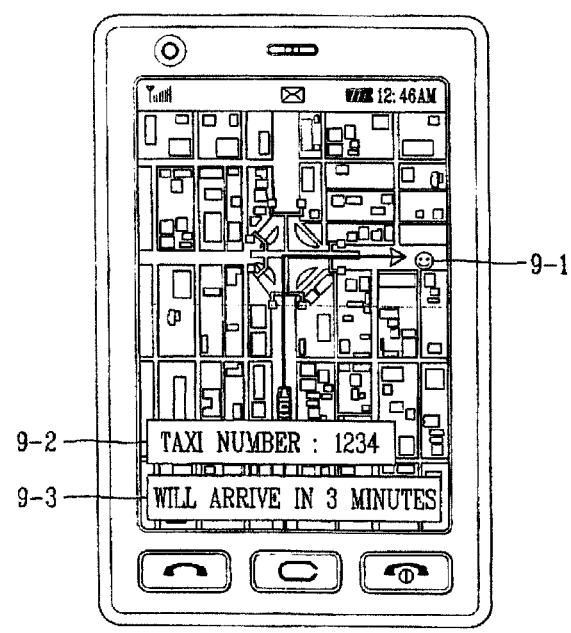
FIG. 9 illustrates a view of a travel path, an expected arrival time, and vehicle information on map data.

FIG. 9 illustrates a view of a travel path, an expected arrival time, and vehicle information on map data. As illustrated in FIG. 9, the controller 603 displays a current location 9-1 of the mobile terminal 600 and a current location of the vehicle (e.g., taxi) on the map data, and displays a travel path from the current location of the vehicle to the mobile terminal 600 as an arrow. Furthermore, the controller 603 displays an icon indicating a taxi on the current location of the vehicle and further displays taxi information 9-2, such as taxi number. The controller 603 may further display a message (e.g., "will arrive in 3 minutes") 9-3 notifying an expected arrival time from the current location of the vehicle to the current location of the mobile terminal 600.

On the other hand, the controller 603 receives a vehicle list (e.g., available taxi vehicle list) including the information of vehicles (e.g., taxis) that can be routed to the current location of the mobile terminal 600 from the server 700 and displays the received vehicle list on the display unit 605. At this time, if particular vehicle information is selected, then the controller 603 may regard it as the taxi request menu being selected.

Figure 10:
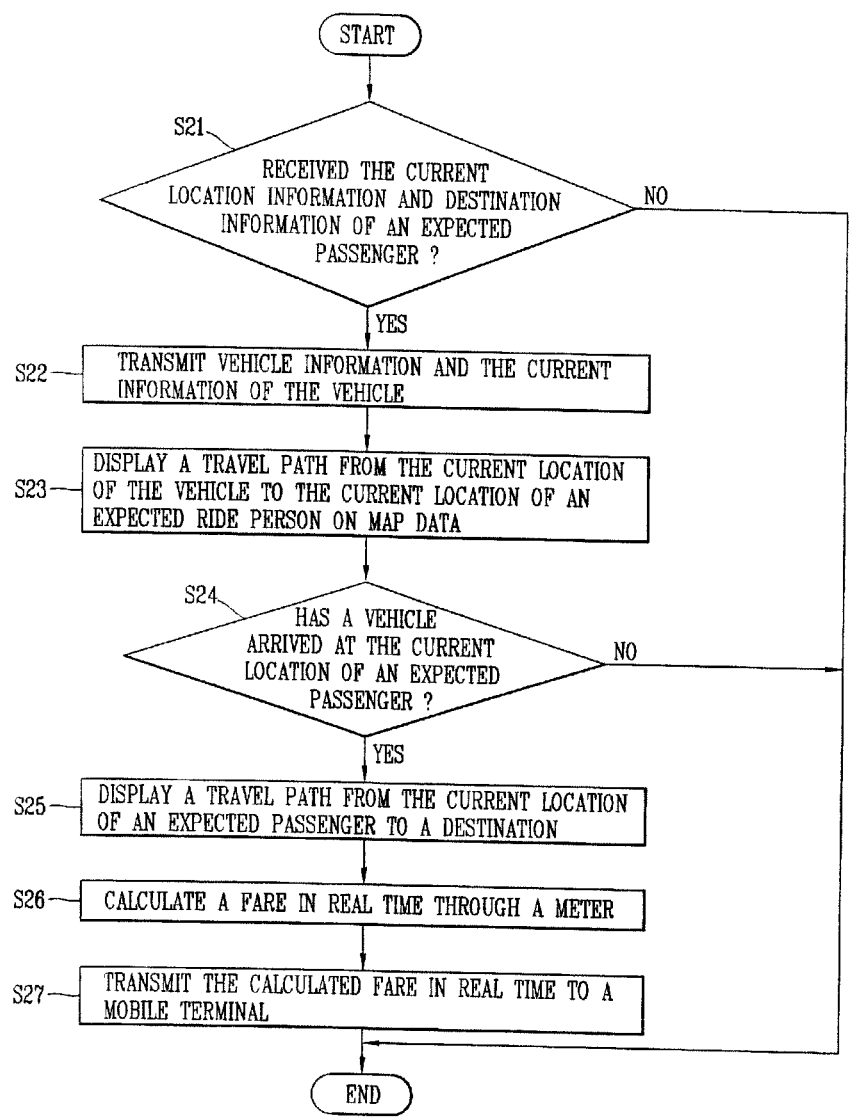
FIG. 10 is a flow chart illustrating a service providing process of a telematics terminal.

FIG. 10 is a flow chart illustrating a service providing process of a telematics terminal. First, it is determined whether the current location information and destination information of an expected passenger is received (S21). In particular, a controller 212 of the telematics terminal determines whether or not the current location information (i.e., current location information of an expected ride person 600) and destination information has been received from the mobile terminal 600 through a communication unit (e.g., CDMA module 206).

If the current location information and destination information have been received, this information is then transferred on (S22). In particular, if the current location information and the destination information are received from the mobile terminal 600, then the controller 212 transmits the current location information and vehicle information of a vehicle (through a communication network based on a taxi driver's selection. Here, the controller 212 may transmit the current location information of the vehicle to the mobile terminal 600 through a communication network in real-time.

Then, a travel path from the current location of the vehicle to the current location of an expected passenger is displayed on map data (S23). More specifically, the controller 212 automatically or manually displays a travel path from the current location of the vehicle to the current location of the mobile terminal 600 (e.g., mobile terminal of an expected passenger) on map data based on the current location information of the mobile terminal 600.

Next, it is determined whether a vehicle has arrived at the current location of the expected passenger (S24). In particular, the controller 212 determines whether or not the vehicle has arrived at the current location of the mobile terminal 600 based on the current location of the vehicle and the location information of the mobile terminal 600. If the vehicle has arrived at the current location, a travel path from the current location of the expected passenger to a destination is displayed (S25). Specifically, when the vehicle has arrived at the current location of the mobile terminal 600, the controller 212 automatically displays a travel path from the current location of the mobile terminal 600 to a destination of the expected ride person (destination information of the mobile terminal 600) based on the destination information of the mobile terminal 600.

Figure 11:
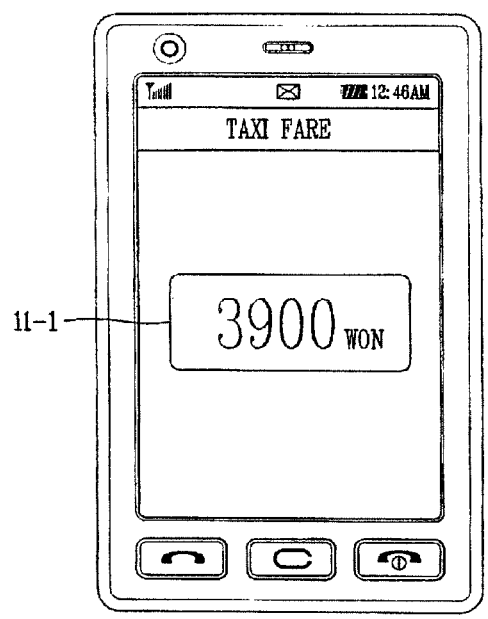
FIG. 11 illustrates a view of fare information transmitted from a telematics terminal.

Then, a fare is calculated in real time through a meter (S26) and the calculated fare is transmitted in real time to a mobile terminal (S27). For example, the meter 410 calculates a fare corresponding to the driving (traveling) distance and time based on a taxi driver's selection in real-time and outputs the calculated fare to the controller 212 and the controller 212 transmits the fare calculated by the meter 410 in real-time to the mobile terminal 600 through the communication network. Upon receipt, the fare may be displayed and/or charged to a credit card via the mobile terminal 600. Here, the controller 212 may transmit the driving distance and driving time detected by the meter 410 in real-time to the mobile terminal 600. The communication network may be a short-range communication network, such as Bluetooth or a long-range communication network, such as CDMA network. In some implementations, the fare is not transmitted to the mobile terminal FIG. 11 illustrates a view of fare information transmitted from a telematics terminal. As illustrated in FIG. 11, a controller 603 of the mobile terminal 600 displays fare information 11-1 that is transmitted from the telematics terminal 200 through the communication network to a display unit 605 The controller 603 may further display the driving distance and driving time on the display unit 605. The transmission and display may occur before, during, or after travel and may be in real-time.

Figure 12:
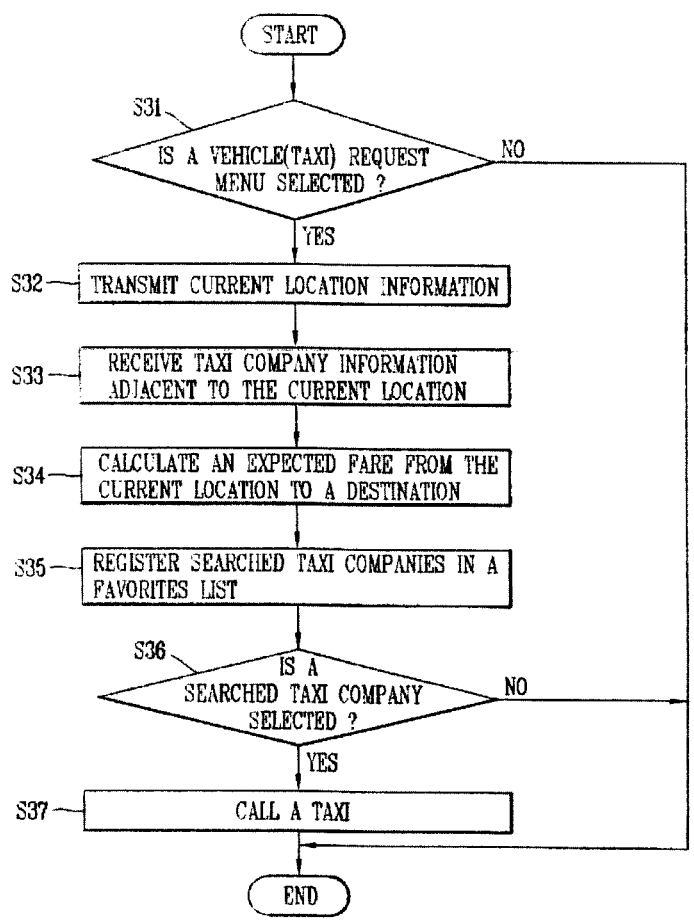
FIG. 12 is a flow chart illustrating a second service providing process of a mobile terminal.

FIG. 12 is a flow chart illustrating a second service providing process of a mobile terminal. First, it is determined whether a vehicle request menu has been selected (S31). In particular, the controller 603 determines whether or not the user has selected a taxi request menu through a microphone 601 or input unit 606. For example, the controller 603 determines whether the taxi request menu displayed on the display unit 605 has been touched by the user, whether "taxi" has been spoken through the microphone 601 by the user, or whether the taxi request menu is selected through the input unit 606 by the user.

If a vehicle request menu has been selected, current location information is transmitted (S32). Specifically, when the taxi request menu is selected by the user, the controller 603 detects a current location from the location detection unit 604 and transmits the detected current location to a preset taxi company server (e.g., an integrated server including the information of taxi companies) through a communication network of the communication unit 607. On the contrary, if a taxi request signal corresponding to the taxi request menu is received from the mobile terminal 600, then the taxi company server may detect the location of the mobile terminal 600 through Wi-Fi or GPS.

If the location of the mobile terminal 600 is detected, then the taxi company server searches taxi companies adjacent to the current location of the mobile terminal 600, and transmits the information of the searched taxi companies to the mobile terminal 600 through the communication network. At this time, the taxi company server may transmit taxi companies adjacent to the current location of the mobile terminal 600 in the order of star rating.

Then, information of taxi companies nearby the current location is received (S33). For example, the controller 603 receives information of taxi companies adjacent to the current location of the mobile terminal 600 from the taxi company server through the communication network and displays the received taxi company information on the display unit 605.

Figure 13:
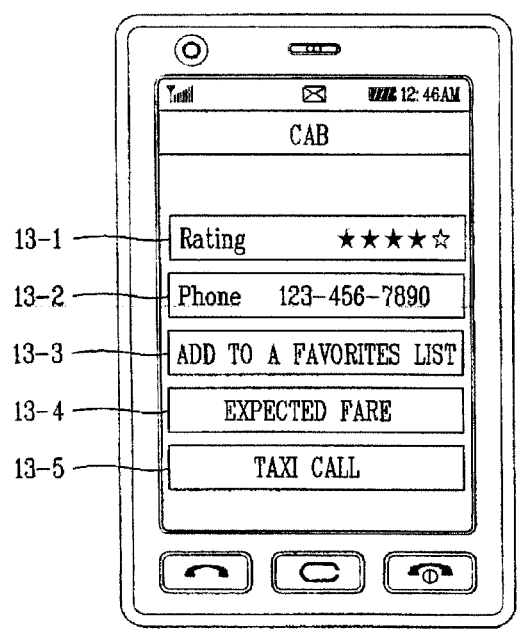
FIG. 13 illustrates a view of taxi company information displayed on a mobile terminal.

FIG. 13 illustrates a view of taxi company information displayed on a mobile terminal. As illustrated in FIG. 13, the controller 603 receives taxi company information (e.g., a taxi company phone number) 13-2 adjacent to the current location of the mobile terminal 600 from the taxi company server through the communication network and displays the received taxi company information 13-2 on the display unit 605. The controller 603 may first display a taxi company having the highest star rating 13-1 among the taxi companies adjacent to the current location of the mobile terminal 600 in the order of star rating.

Next, an expected fare from the current location to a destination is calculated (S34). More specifically, if an expected fare menu 13-4 displayed along with the taxi company information is selected by the user, then the controller 603 calculates an expected taxi fare from the current location to the destination and displays the calculated expected taxi fare on the display unit 605. On the other hand, if an expected fare menu 13-4 that is displayed along with the taxi company information is selected by the user, then the controller 603 may request an expected taxi fare from the current location to the destination to the taxi company server and may receive the expected taxi fare from the server prior to displaying the expected taxi fare.

Thereafter, searched taxi companies are registered in a favorites list (S35). In particular, if a favorites menu 13-3 displayed along with the taxi company information is selected by the user, then the controller 603 registers the displayed taxi company information in a favorites company list of the mobile terminal 600. Then, it is determined whether a searched taxi company has been selected (S36). Specifically, the controller 603 determines whether or not a taxi call menu 13-5 that is displayed along the taxi company information is selected by the user.

If a searched taxi company has been selected, a taxi is called (S37). Specifically, when a taxi call menu 13-5 that is displayed along the taxi company information is selected by the user, then the controller 603 calls a taxi. For example, if a taxi call menu 13-5 that is displayed along the taxi company information is selected by the user, then the controller 603 transmits a taxi call message to the taxi company server. The controller 603 may transmit a ride reservation time as well as the taxi call message to the taxi company server through a communication network. In some implementations, the call is conducted by the mobile terminal 600 without need for user input. For example, the mobile terminal 600 may receive the taxi company phone number through the taxi company server and may dial this number without requiring the user of the mobile terminal 600 to manually enter each of the digits of the number.

At this time, the taxi company server receives a taxi call message, and selects any one of the neighboring taxis based on the taxi call message, and the location information of the user to a telematics terminal mounted on the selected taxi. Accordingly, the selected taxi driver may give a ride to the user based on the location information of the user.

On the other hand, the taxi company server may receive an expected fare list including expected fare information provided by taxi drivers from a telematics terminal mounted on each taxi vehicle and provide the received expected fare list to the controller 603. At this time, the controller 603 transmits taxi information corresponding to an expected fare selected by the user from the expected fare list to the taxi company server and the user may thereby use a taxi corresponding to the expected fare selected by the user himself or herself. Here, the taxi company server reads the least expected fare from the expected fare list including expected fare information provided by taxi drivers and provides only taxi information corresponding to the read expected fare to the controller 603, and the user may thereby use a taxi that has provided the lowest expected fare.

Figure 14:
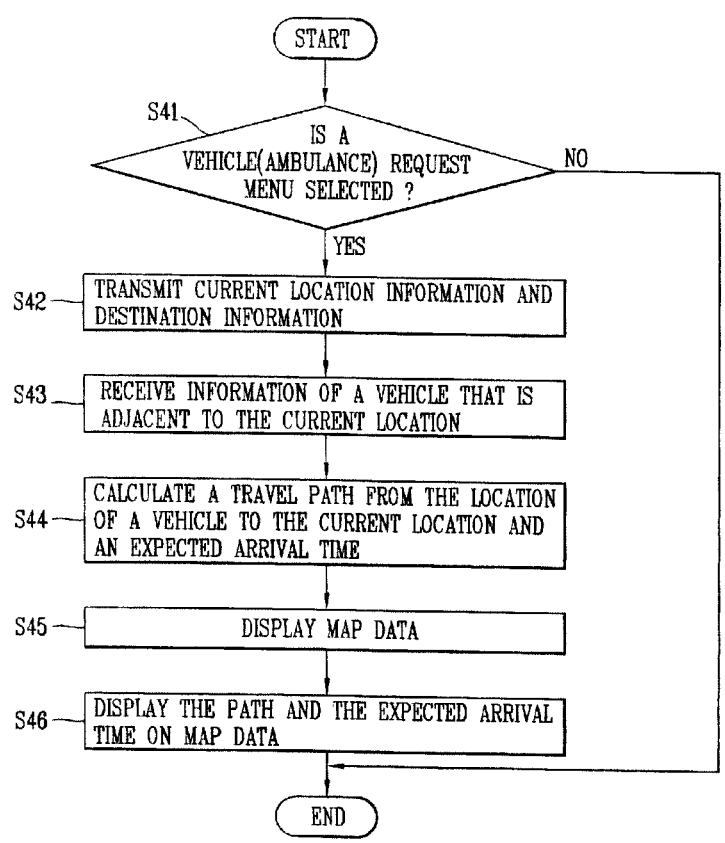
FIG. 14 is a flow chart illustrating a third service providing process of a mobile terminal.

FIG. 14 is a flow chart illustrating a third service providing process of a mobile terminal. First, it is determined whether a vehicle request menu is selected (S41). In particular, the controller 603 determines whether or not the user has selected a vehicle request menu through a microphone 601 or input unit 606. For example, when the user is required to request an ambulance in an emergency state, the controller 603 determines whether the ambulance request menu displayed on the display unit 605 has been touched by the user, whether "ambulance" or "911" has been spoken through the microphone 601 by the user, or whether the ambulance request menu is selected through the input unit 606 by the user.

If the ambulance request menu is selected by the user, then the controller 603 may receive destination information (e.g., particular hospital name) through a microphone 601 or input unit 606. For example, if destination information (e.g., hospital) is spoken by the user through the microphone 601 or a destination name (e.g., a hospital name) is inputted by the user through the input unit 606, then the controller 603 receives the inputted destination information. At this time, the location detection unit 604 detects the current location and outputs the detected current location to the controller 603.

Next, currently location information and destination information are transmitted (S42). Specifically, the controller 603 receives the destination information and the current location information and transmits the received destination information and current location information to an "emergency center" integrated server through a communication network of the communication unit 607. Here, the "emergency center" integrated server may be a server for managing ambulances in an integrated way, and the destination information and the current location information may be directly transmitted to a telematics terminal 200 mounted on an available ambulance through the communication network. As a result, the controller 603 may transmit the destination information and the current location information of the mobile terminal 600 to the telematics terminal through the "emergency center" integrated server or may directly transmit it to the telematics terminal 200.

The telematics terminal receives the destination information and the current location information from the "emergency center" integrated server through the communication network and transmits vehicle information and the current location information of the vehicle (e.g., ambulance) based on an emergency medical technician selection to the mobile terminal 600 through the communication network. For example, when a displayed key for transmitting vehicle information and current location information is selected by an emergency medical technician, the telematics terminal transmits vehicle information (e.g., vehicle number) and current location information to the mobile terminal 600 through the communication network. Here, the "emergency center" integrated server transmits the destination information and the current location information to an ambulance adjacent to the current location of the mobile terminal 600.

Then, information of a vehicle that is adjacent to the current location is received (S43). Specifically, the communication unit 607 receives the information of a vehicle that is adjacent to the current location from the telematics terminal through the communication network and outputs the received vehicle information and the current location information of the vehicle to the controller 603.

Thereafter, an expected arrival time and a travel path from the location of the vehicle to the current location are calculated (S44). For example, the controller 603 calculates a travel path from the current location of the vehicle to the current location of the mobile terminal 600 based on the current location information of the vehicle. Furthermore, the controller 603 calculates an expected arrival time from the current location of the vehicle to the current location of the mobile terminal 600 based on the current location information of the vehicle. The map data is displayed (S45) and the path and the expected arrival time is also displayed (S46). Specifically, the controller 603 calculates the travel path and the expected arrival time, and then reads map data from a storage unit and displays the read map data on the display unit 605. Also, the controller 603 displays the travel path, the expected arrival time, and the vehicle information on the map data.

Figure 15:
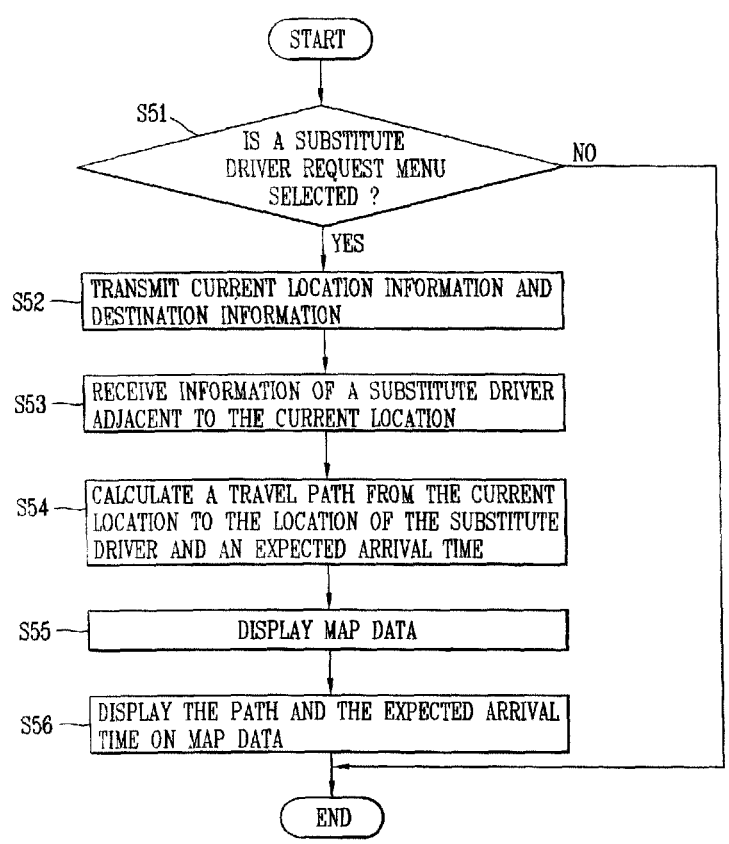
FIG. 15 is a flow chart illustrating a fourth service providing process of a mobile terminal.

FIG. 15 is a flow chart illustrating a fourth service providing process of a mobile terminal. First, it is determined whether a substitute driver request menu is selected (S51). In particular, the controller 603 determines whether or not the user has selected a substitute driver request menu through a microphone 601 or input unit 606. For example, when the user is unable to drive his or her own car, the controller 603 determines whether the substitute driver request menu displayed on the display unit 605 has been touched by the user, "substitute driver" has been spoken through the microphone 601 by the user, or whether the substitute driver request menu is selected through the input unit 606 by the user. Furthermore, the controller 603 receives a substitute driver list including available substitute drivers that can be moved to the current location of the mobile terminal 600 from the server and displays the received substitute driver list on the display unit 605. At this time, if a particular driver is selected on the substitute driver list by the user, then the controller 603 may regard it as the substitute driver request menu being selected.

If the substitute driver request menu is selected by the user, then the controller 603 receives destination information (e.g., house location) through a microphone 601 or input unit 606. For example, if a destination name (e.g., my house) is spoken by the user through the microphone 601 or destination information (e.g., house address) is inputted by the user through the input unit 606, then the controller 603 receives the inputted destination information. At this time, the location detection unit 604 detects the current location and outputs the detected current location to the controller 603.

If a substitute driver request menu is selected, current location information and destination information is transmitted (S52). For example, the controller 603 receives the destination information and the current location information and transmits the received destination information and current location information to an integrated server of substitute drivers companies through a communication network of the communication unit 607.

The controller 603 may transmit an expected substitute driver arrival time as well as the current location information and destination information to an integrated server of substitute drivers companies through a communication network. Here, the integrated server of substitute drivers companies may be a server for integrated management of substitute drivers and the destination information and the current location information may be directly transmitted to a mobile terminal of an available substitute driver through the communication network. As a result, the controller 603 may transmit the destination information and the current location information of the mobile terminal 600 to the mobile terminal of the substitute driver through the integrated server of substitute drivers companies or may directly transmit it to the mobile terminal of the substitute driver.

The mobile terminal of the substitute driver receives the destination information and the current location information from the integrated server of the substitute drivers companies through the communication network and transmits the current location information of a substitute driver and/or the substitute driver information (e.g., phone number) based on the substitute driver's selection to the mobile terminal 600 through the communication network. For example, when "a displayed key for transmitting his or her own location information and phone number" is selected by a substitute driver, the mobile terminal of the substitute driver transmits "his or her own location information" and "phone number" to the mobile terminal 600 through the communication network. Here, the integrated server of the substitute drivers companies transmits the destination information and the current location information to a mobile terminal carried by a substitute driver adjacent to the current location of the mobile terminal 600.

Then, information of a substitute driver adjacent to the current location is received (S53). Specifically, the communication unit 607 receives the information of the substitute driver adjacent to the current location and the current location information of the substitute driver from the mobile terminal of the substitute driver through the communication network and outputs the received substitute driver information (e.g., phone number) and the current location information of the substitute driver to the controller 603.

Thereafter, an expected arrival time and a travel path from the current location to the location of the substitute driver are calculated (S54). In particular, the controller 603 calculates a travel path from the current location to the location of the substitute driver based on the location information of the substitute driver. Furthermore, the controller 603 calculates an expected arrival time from the location of the substitute driver to the current location of the mobile terminal 600.

Finally, map data is displayed (S55) and the path and the expected arrival time is displayed on the map data (S66). For example, the controller 603 calculates the travel path and the expected arrival time, and then reads map data from a storage unit and displays the read map data on the display unit 605. Also, the controller 603 displays the travel path, the expected arrival time, and the vehicle information on the map data.

On the other hand, the integrated server of substitute drivers companies may receive an expected fare list including expected fare information (i.e., expected substitute driver fare) provided by substitute drivers from a mobile terminal of each substitute driver and may provide the received expected fare list to the controller 603. At this time, the controller 603 transmits substitute driver information corresponding to an expected fare selected by the user from the expected fare list to the integrated server of substitute drivers companies and the user may thereby select a substitute driver corresponding to the expected fare selected by the user himself or herself. Here, the integrated server of substitute drivers companies reads the least expected fare from the expected fare list including expected fare information provided by substitute drivers and provides only substitute driver information corresponding to the read expected fare to the controller 603. The user may thereby select a substitute driver that has provided the lowest expected fare.

Figure 16:
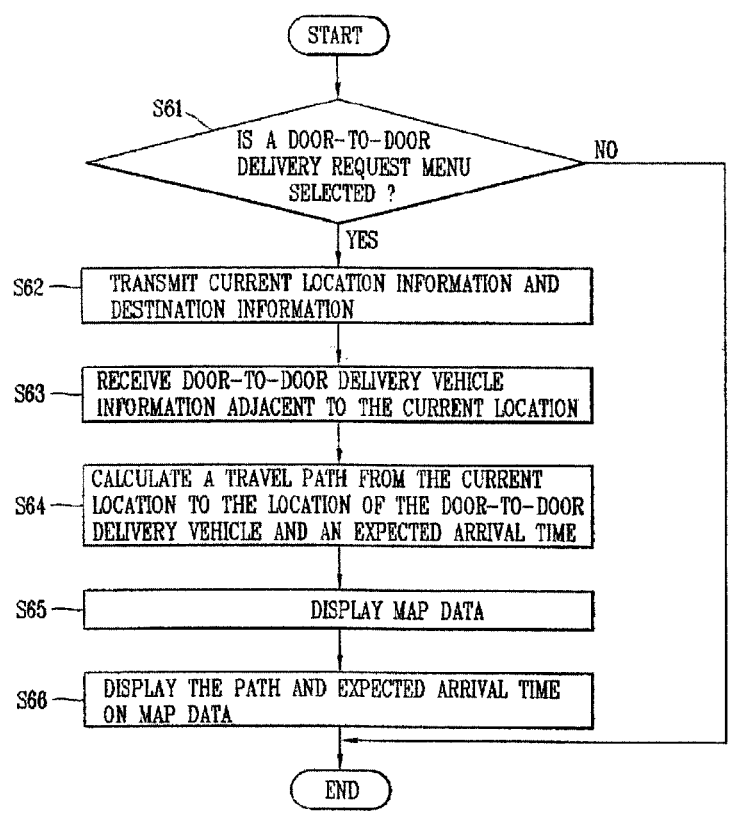
FIG. 16 is a flow chart illustrating a fifth service providing process of a mobile terminal.

FIG. 16 is a flow chart illustrating a fifth service providing process of a mobile terminal. First, it is determined whether a door-to-door deliver request menu is selected (S61). Specifically, the controller 603 determines whether or not the user has selected a door-to-door delivery service request menu through a microphone 601 or input unit 606. For example, when the user is unable to drive his or her own car, the controller 603 determines whether the door-to-door delivery service request menu displayed on the display unit 605 has been touched by the user, whether "door-to-door delivery service" has been spoken through the microphone 601 by the user, or whether the door-to-door delivery service request menu is selected through the input unit 606 by the user. Furthermore, the controller 603 receives a vehicle list including available door-to-door delivery service vehicles that can be moved to the current location of the mobile terminal 600 from the server (e.g., an integrated server of door-to-door delivery service companies) and displays the received vehicle list on the display unit 605. At this time, if a particular vehicle is selected on the vehicle list by the user, then the controller 603 may regard it as the door-to-door delivery service request menu being selected.

If the door-to-door delivery service request menu is selected by the user, then the controller 603 receives destination information (e.g., destination address) through a microphone 601 or input unit 606. For example, if a destination address is spoken by the user through the microphone 601 or destination information is inputted by the user through the input unit 606, then the controller 603 receives the inputted destination information. At this time, the location detection unit 604 detects the current location and outputs the detected current location to the controller 603.

If a door-to-door deliver request menu is selected, current location information and destination information are transmitted (S62). In particular, the controller 603 receives the destination information and the current location information and transmits the received destination information and current location information to an integrated server of door-to-door delivery service companies through a communication network of the communication unit 607. The controller 603 may transmit a delivery reservation time and the current location information to an integrated server of door-to-door delivery service companies so as to enable a door-to-door delivery vehicle to arrive at the current location at a user's reserved time. Here, the integrated server of door-to-door delivery service companies may be a server for managing door-to-door delivery vehicles in an integrated way and the destination information and the current location information may be directly transmitted to a telematics terminal of an available door-to-door delivery vehicle through the communication network. As a result, the controller 603 may transmit the destination information and the current location information of the mobile terminal 600 to the telematics terminal of the door-to-door delivery vehicle through the integrated server of door-to-door delivery service companies or may directly transmit it to the telematics terminal of the door-to-door delivery vehicle.

The telematics terminal of the door-to-door delivery vehicle receives the destination information and the current location information from the integrated server of the door-to-door delivery service companies through the communication network and transmits the current location the door-to-door delivery vehicle and the door-to-door delivery vehicle information (e.g., vehicle number, vehicle color, vehicle model, driver's photo, or driver's personal information) based on the door-to-door delivery vehicle driver's selection to the mobile terminal 600 through the communication network. For example, when a displayed key for transmitting door-to-door delivery vehicle location information and vehicle information is selected by a door-to-door delivery vehicle driver, the telematics terminal of the door-to-door delivery vehicle transmits door-to-door delivery vehicle location information and vehicle information to the mobile terminal 600 through the communication network. Here, the integrated server of the door-to-door delivery service companies transmits the destination information and the current location information to a telematics terminal mounted on a door-to-door delivery vehicle or a mobile terminal of a door-to-door delivery vehicle driver adjacent to the current location of the mobile terminal 600.

Next, door-to-door delivery vehicle information adjacent to the current location is received (S63). More particularly, the communication unit 607 receives the door-to-door delivery vehicle information adjacent to the current location and the current location information of the door-to-door delivery vehicle from the telematics terminal through the communication network and outputs the received door-to-door delivery vehicle information and the current location information of the door-to-door delivery vehicle to the controller 603.

Thereafter, an expected arrival time and a travel path from the current location to the location of the door-to-door delivery vehicle are calculated (S64). For example, the controller 603 calculates a travel path from the current location to the location of the door-to-door delivery vehicle based on the location information of the door-to-door delivery vehicle. Furthermore, the controller 603 calculates an expected arrival time from the location of the door-to-door delivery vehicle to the current location of the mobile terminal 600.

Then, map data is displayed (S65) and the path and expected arrival time are displayed on the map data (S66). In particular, the controller 603 calculates the travel path and the expected arrival time and then reads map data from a storage unit and displays the read map data on the display unit 605. Also, the controller 603 displays the travel path, the expected arrival time, and the vehicle information on the map data.

On the other hand, the integrated server of door-to-door delivery service companies may receive an expected fare list including expected fare information (e.g., expected door-to-door delivery service fare) provided by door-to-door delivery vehicle drivers from a mobile terminal of each door-to-door delivery vehicle driver or a telematics terminal mounted on a door-to-door delivery vehicle and provide the received expected fare list to the controller 603. In particular, the controller 603 transmits door-to-door delivery vehicle information corresponding to an expected fare selected by the user from the expected fare list to the integrated server of door-to-door delivery service companies, and the user may thereby select a door-to-door delivery vehicle corresponding to the expected fare. Here, the integrated server of door-to-door delivery service companies reads the least expected fare from the expected fare list. The expected fare list includes expected fare information provided by door-to-door delivery vehicle drivers. Thereafter, the integrated server provides door-to-door delivery vehicle driver information corresponding to the read expected fare to the controller 603 and the user may thereby select a door-to-door delivery vehicle driver that has provided the lowest expected fare.

As the above description may be implemented in various forms without departing from the characteristics thereof, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method comprising:
    displaying, on a user device, information associated with multiple service providers in a predetermined order;
    after displaying the information associated with the multiple service providers, receiving, at the user device, a selection associated with a first service provider of the multiple service providers, the first service provider being associated with a first location;
    determining, at the user device, a second location, the second location being associated with the user;
    sending, from the user device to the first service provider, a of the user, a service request and the determined second location associated with the user;
    receiving, from the first service provider, information, to be used by the first service provider, regarding an association between the first and second locations;
    matching the information regarding the association between the first and second locations with a map on the user device; and
    rendering, on the user device, the map matched with the information regarding the association between the first and second locations, wherein:
the information regarding the association between the first and second locations is a route between the first and second locations to be used by the first service provider, and
matching the information regarding the association between the first and second locations with a map stored on the user device comprises matching the route between the first and second locations to be used by the first service provider with a map stored on the user device.

2. The method of claim 1, wherein receiving the selection associated with the first service provider includes receiving a request for a taxi.

3. The method of claim 2, wherein rendering the map matched with the information regarding the association between the first and second locations includes rendering a map indicating a path to be traversed by a taxi from the first location to the second location.

4. The method of claim 2 further comprising receiving, from the first service provider, an indication corresponding to a taxi fare.

5. The method of claim 1 wherein:
displaying the information associated with the multiple service providers includes rendering, on the user device, a list of multiple taxi service providers,
receiving the selection associated with the service provider includes receiving a selection of a particular taxi service provider from the rendered list of multiple taxi service providers.

6. The method of claim 1 wherein receiving the information, to be used by the first service provider, regarding the association between the first and second locations includes receiving a designation of a current location of a taxi and a route the taxi is expected to take from the current location of the taxi to the user device.

7. The method of claim 1 wherein determining the second location associated with the user includes determining the location of the user device.

8. The method of claim 1 wherein determining the second location associated with the user includes determining a location other than the location of the user device.

9. The method of claim 8 further comprising receiving, at the user device, input designating a location as the second location.

10. The method of claim 1 wherein receiving the information, to be used by the first service provider, regarding the association between the first and second locations includes receiving a route computed by the first service provider.

11. The method of claim 1 wherein receiving the selection associated with the first service provider includes receiving a request for an emergency responder.

12. The method of claim 11 wherein receiving the request for an emergency responder includes receiving a request for an ambulance.

13. The method of claim 1 wherein receiving the selection associated with the first service provider includes receiving a request for a substitute driver.

14. The method of claim 1 wherein receiving the selection associated with the first service provider includes receiving a request for a door-to-door delivery.

15. The method of claim 1, wherein displaying the information associated with the multiple service providers includes displaying, on the user device, information associated with multiple taxi companies in an order of star rating.

16. The method of claim 1, wherein displaying the information associated with the multiple service providers includes displaying, on the user device, information of a taxi company having a highest star rating.

17. The method of claim 1, wherein displaying the information associated with the multiple service providers includes displaying, on the user device, taxi information corresponding to a lowest expected fare among expected fare information provided by taxi drivers.

18. A mobile terminal comprising:
an input unit configured to receive input from a user;
a communication unit configured to communicate across a wireless network;
a display; and
a controller configured to:
display, on the display, information associated with multiple service providers in a predetermined order;
after displaying the information associated with the multiple service providers, receive, from the input unit, an indication of a user selection associated with a first service provider of the multiple service providers, the first service provider being associated with a first location,
determine a second location, the second location being associated with the user,
send, with the communication unit and to the first service provider, a destination of the user, a service request and the determined second location associated with the user,
receive, from the first service provider and with the communication unit, information, to be used by the first service provider, regarding an association between the first and second locations,
match the information regarding the association between the first and second locations with a map on the user device; and
render, on the display, the map matched with the information regarding the association between the first and second locations,
wherein:
the information regarding the association between the first and second locations is a route between the first and second locations to be used by the first service provider, and
the controller is configured to match the information regarding the association between the first and second locations with a map stored on the user device by matching the route between the first and second locations to be used by the first service provider with a map stored on the user device.

19. The terminal of claim 18 wherein, to receive the selection associated with the first service provider, the controller is configured to receive a request for a taxi.

20. The terminal of claim 19 wherein the controller is configured to:
receive, from the first service provider and with the communication unit, an indication corresponding to a taxi fare; and
enable rendering, on the display, of the indication corresponding to the taxi fare.

21. The terminal of claim 18 wherein:
to display the information associated with the multiple service providers the controller is configured to enable rendering, on the display, of a list of multiple taxi service providers; and
to receive the selection associated with the service provider, the controller is configured to receive a selection of a particular taxi service provider from the rendered list of multiple taxi service providers.

22. The terminal of claim 18 wherein, to receive the information regarding the association between the first and second locations, the controller is configured to receive, with the communication unit, a designation of a current location of a taxi and a route the taxi is expected to take from the current location of the taxi to the mobile terminal.

23. The terminal of claim 18 further comprising a global positioning system unit, wherein to determine the second location associated with the user, the controller is configured to determine, with the global positioning unit, the location of the mobile terminal.

24. The terminal of claim 18 wherein to determine the second location associated with the user, the controller is configured to receiver, from the input unit, input designating a location as the second location.

25. The terminal of claim 18 wherein, to receive the selection associated with the first service provider, the controller is configured to receive a request for an emergency responder.

26. The terminal of claim 18 wherein, to receive the selection associated with the first service provider, the controller is configured to receive a request for an ambulance.

27. The terminal of claim 18 wherein, to receive the selection associated with the first service provider, the controller is configured to receive a request for a substitute driver.

28. The terminal of claim 18 wherein, to receive the selection associated with the first service provider, the controller is configured to receive a request for a door-to-door delivery.

29. The terminal of claim 18, wherein the controller is configured to display, on the display, information associated with multiple taxi companies in an order of star rating.

30. The terminal of claim 18, wherein the controller is configured to display, on the display, information of a taxi company having a highest star rating.

31. The terminal of claim 18, wherein the controller is configured to display, on the display, taxi information corresponding to a lowest expected fare among expected fare information provided by taxi drivers.

* * * * *